US011019185B1

(12) United States Patent
VanBlon et al.

(10) Patent No.: US 11,019,185 B1
(45) Date of Patent: May 25, 2021

(54) DATA USAGE NEGOTIATION

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); Arnold S. Weksler, Raleigh, NC (US); Mark Patrick Delaney, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/834,587

(22) Filed: Mar. 30, 2020

(51) Int. Cl.
*G06F 15/173* (2006.01)
*H04L 29/06* (2006.01)
*H04L 29/08* (2006.01)
*H04L 12/24* (2006.01)
*H04L 12/26* (2006.01)

(52) U.S. Cl.
CPC ............. *H04L 69/24* (2013.01); *H04L 41/06* (2013.01); *H04L 43/08* (2013.01); *H04L 67/141* (2013.01); *H04L 67/327* (2013.01)

(58) Field of Classification Search
CPC ......... H04W 72/0486; H04W 72/0493; H04W 72/04; H04W 28/20; H04W 28/22; H04W 28/16
See application file for complete search history.

(56) References Cited

U.S. PATENT DOCUMENTS

| 10,785,615 | B2* | 9/2020 | Baron | H04M 15/882 |
| 2013/0196617 | A1* | 8/2013 | Zalmanovitch | H04M 15/41 |
| | | | | 455/405 |
| 2014/0129385 | A1* | 5/2014 | Anderson | H04L 12/145 |
| | | | | 705/26.41 |
| 2015/0237490 | A1* | 8/2015 | Chang | H04M 15/30 |
| | | | | 455/406 |
| 2018/0351964 | A1* | 12/2018 | Kaguma | H04L 63/0853 |
| 2019/0166521 | A1* | 5/2019 | Ali | H04L 12/1403 |
| 2020/0196198 | A1* | 6/2020 | Hoffner | H04W 4/90 |

* cited by examiner

*Primary Examiner* — Cheikh T Ndiaye
(74) *Attorney, Agent, or Firm* — Ference & Associates LLC

(57) ABSTRACT

One embodiment provides a method, including: detecting, at a network device and from an information handling device, a request to connect to a network; receiving, from the information handling device, an indication of an expected data usage to be used by the information handling device on the network; enabling, responsive to approving of the expected data usage, the information handling device to connect to the network; determining, using a processor, whether an actual data usage by the information handling device is different than the expected data usage; and performing, responsive to determining that the actual data usage is different than the expected data usage, an action. Other aspects are described and claimed.

20 Claims, 3 Drawing Sheets

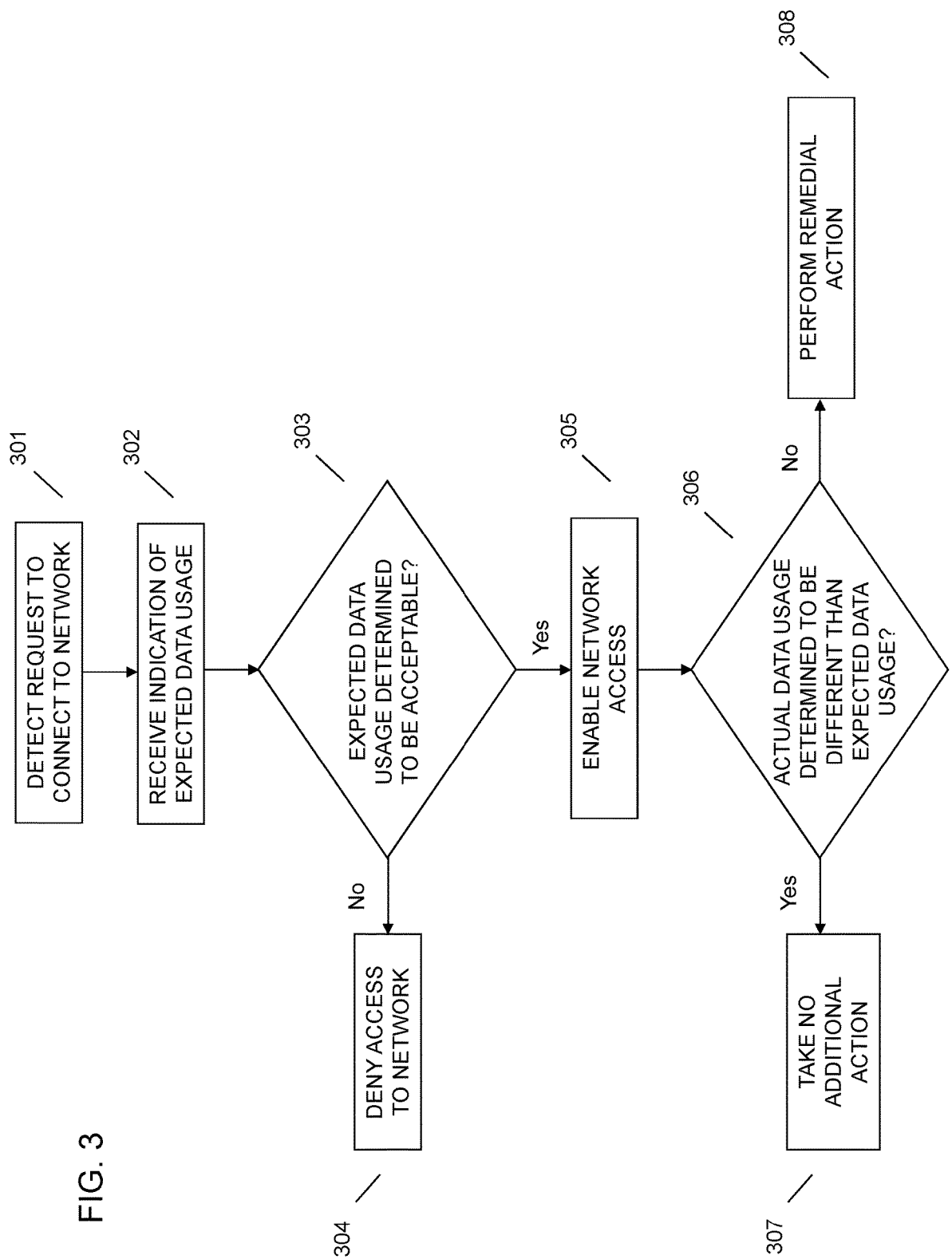

DATA USAGE NEGOTIATION

BACKGROUND

A multitude of different types of information handling devices ("devices"), for example, smart phones, tablets, smart watches, laptops, Internet of Things (IoT) devices, other smart devices, and the like, are capable of establishing connections to different networks. After a network connection is established, the device may have access to the internet and may subsequently begin consuming network bandwidth through the engagement of one or more internet-based activities.

BRIEF SUMMARY

In summary, one aspect provides a method, comprising: detecting, at a network device and from an information handling device, a request to connect to a network; receiving, from the information handling device, an indication of an expected data usage to be used by the information handling device on the network; enabling, responsive to approving of the expected data usage, the information handling device to connect to the network; determining, using a processor, whether an actual data usage by the information handling device is different than the expected data usage; and performing, responsive to determining that the actual data usage is different than the expected data usage, an action.

Another aspect provides a network device, comprising: a processor; a memory device that stores instructions executable by the processor to: detect a request from an information handling device to connect to a network; receive, from the information handling device, an indication of an expected data usage to be used by the information handling device on the network; enable, responsive to approving of the expected data usage, the information handling device to connect to the network; determine whether an actual data usage by the information handling device is different than the expected data usage; and perform, responsive to determining that the actual data usage is different than the expected data usage, an action.

A further aspect provides a product, comprising: a storage device that stores code, the code being executable by a processor and comprising: code that detects a request to connect to a network from an information handling device; code that receives, from the information handling device, an indication of an expected data usage to be used by the information handling device on the network; code that enables, responsive to approving of the expected data usage, the information handling device to connect to the network; code that determines whether an actual data usage by the information handling device is different than the expected data usage; and code that performs, responsive to determining that the actual data usage is different than the expected data usage, an action.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of negotiating and enforcing the available data consumable by a device on a network.

DETAILED DESCRIPTION

Figure 1:
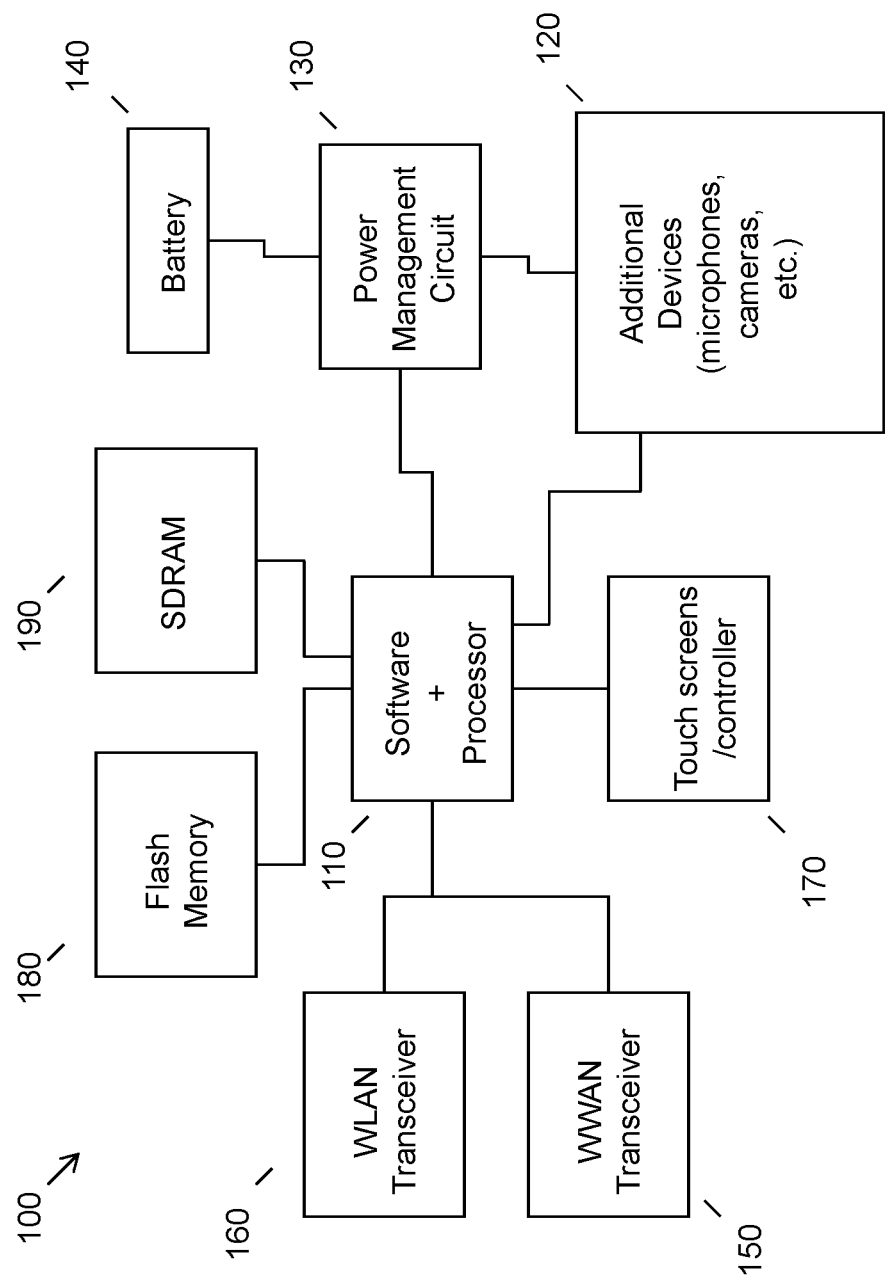
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

External devices (e.g., mesh network devices belonging to other users, etc.) may be granted access to a user's network. Generally, this network enablement is performed without the conveyance or discussion of the external devices' bandwidth needs. Consequently, situations may arise where an external device may overstep its bounds and consume more data than the network user would prefer. Additionally, instances may arise where internal devices existing and functioning within a user's network (e.g., IoT devices, personal computing devices, mobile electronic devices, etc.) may consume more data than expected. Such instances may indicate that a user's device is not operating as expected (e.g., due to a malfunction, due to takeover by a bad actor, etc.).

Existing solutions enable users to setup bandwidth monitoring applications on each network-connected device. These applications may track data usage over time and may provide the user with graphs and tables of data that they can review. Similarly, in lieu of installing a bandwidth monitoring application on each device, which may be burdensome and unfeasible in certain situations, users may examine the network bandwidth usage from a single point, i.e., a router capable of tracking bandwidth consumption. Additionally, users may establish a data quota for each device and may be alerted when a device approaches or exceeds a particular data limit. However, all of these solutions require moderate to large involvement by the user, which may be time-consuming and burdensome. Furthermore, none of these existing solutions facilitate a pre-emptive discussion with an access requesting device, which may be beneficial to outline certain bandwidth consumption boundaries at the outset of the device-network relationship.

Accordingly, an embodiment provides a method for engaging in an up-front bandwidth negotiation with devices requesting access to a network. In an embodiment, a request by a device to connect to a network may be detected at a network device (i.e., a device that facilitates network access such as a router). An embodiment may then receive an indication of an expected data usage to be used by the device on the network. If an embodiment does not approve of the expected data usage (e.g., because it is too high, etc.), it can deny the device's network access request and/or dynamically negotiate an alternative expected data usage allotment. If, however, the embodiment approves of the advertised expected data usage, it can thereafter grant the device access to the network. At this stage an embodiment can further monitor the device's actual data usage on the network to ensure that it remains within the approved data usage bounds. If the actual data usage by the device is determined to be different from the expected data usage (e.g., exceeds the expected data usage, falls abnormally short of the expected data usage, etc.) then an embodiment may perform an action to remedy the situation. Such a method may better control bandwidth usage occurring on a network by either internal or external devices.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
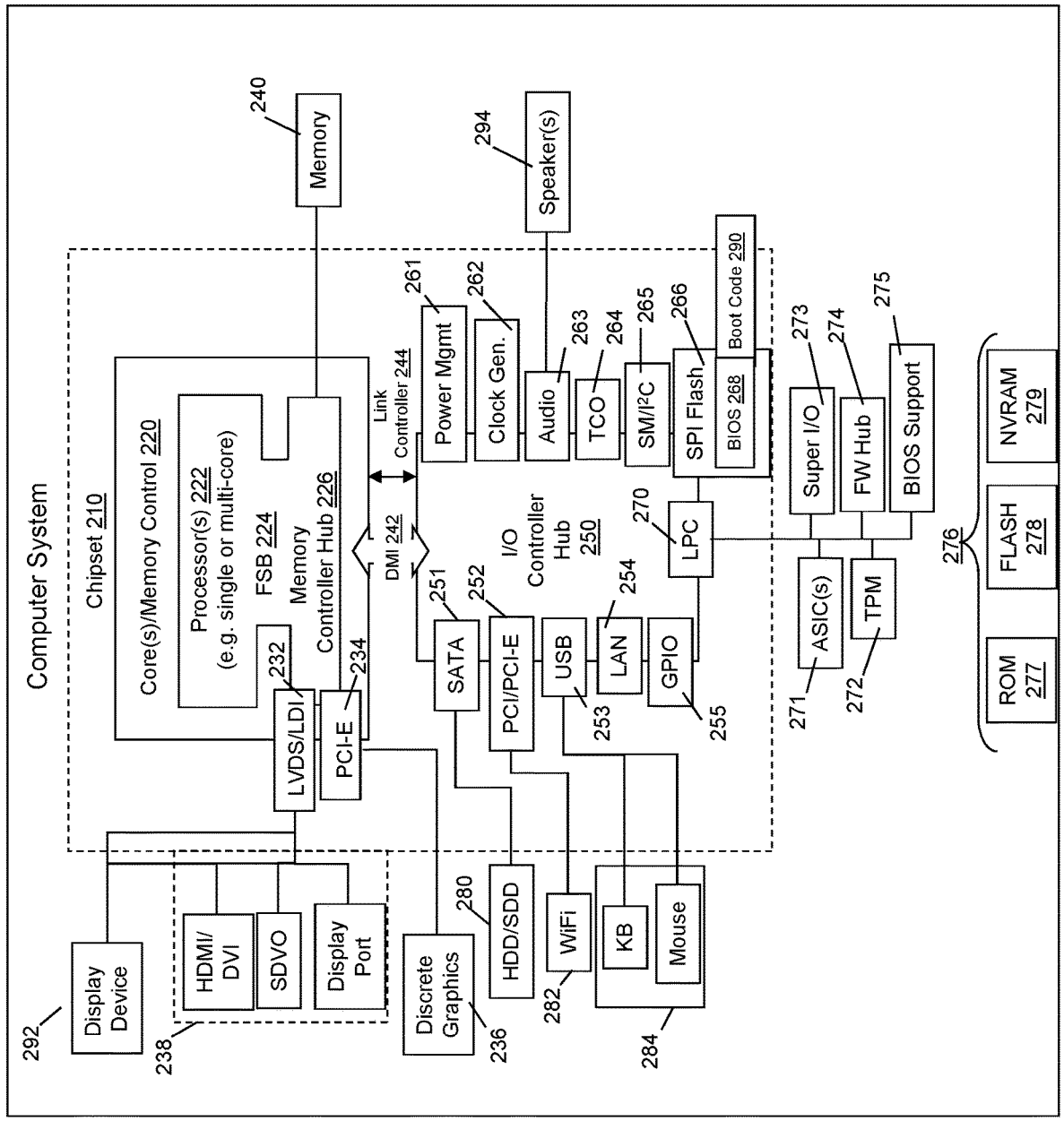
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices that are capable of establishing a wireless connection with a network. For example, the circuitry outlined in FIG. 1 may be implemented in a smart phone or tablet embodiment, whereas the circuitry outlined in FIG. 2 may be implemented in a laptop.

Referring now to FIG. 3, an embodiment provides a method of pre-emptively negotiating the available data consumable by a device on a network and thereafter ensuring that the agreed-to data boundaries are abided by. At 301, an embodiment may detect a request from a device to connect to a network. The device may be either an internal device (e.g., existing devices common to a user's network, etc.) or an external device (e.g., a device belonging to another individual that is not common to the user's network, etc.).

At 302, an embodiment may receive an indication of an expected data usage to be used by the device while they are connected to the network. The expected data usage may outline an amount of data the access-requesting plans on using, or desires to use, while connected to the network. This data amount may be conveyed via provision of an exact number (e.g., 100 bytes, 50 megabytes, etc.) or, alternatively, may be conveyed via provision of a data range (e.g., 100 bytes-125 bytes, 50 megabytes-55 megabytes, etc.). Additionally or alternatively, the data amount may be conveyed via provision of an exact number or range needed over a particular period of time (e.g., 100 bytes per hour, 50-55 megabytes per week, etc.). Additionally or alternatively, the expected data usage indication may not provide a numerical data amount at all, but rather, may provide a request for a data amount that is appropriate for a certain task. For example, an embodiment may request to receive enough data to efficiently stream a conventional 30 minute video.

At 303, an embodiment may determine whether the expected data usage is acceptable. More particularly, if the expected data usage that is advertised by the device falls within an acceptable range, an embodiment may grant the device access to the network with an understanding that the device's data usage stays within that range. The determination of whether the expected data usage falls within the acceptable range may be facilitated by comparison to a data allotment table (e.g., stored in an accessible storage location either locally on the network device or remotely on another device or server, etc.). The data allotment table may contain threshold information for acceptable amounts of data that may be allotted to requesting devices during a particular time or to achieve a particular task.

In an embodiment, the determination of whether the expected data usage falls within an acceptable threshold may be based at least partially on device type or task type. For example, a large expected data usage request from a device known to consume large amounts of data may not be unusual whereas the same type of request from a device known to consume significantly smaller amounts of data may set off a red flag. Similarly, a large expected data usage request may not be unusual to perform a known high data usage task (e.g., streaming large videos, playing games, etc.) whereas the same data allotment request to perform a known low data usage task may be a cause for concern.

Responsive to determining, at 303, that the expected data usage advertised by the device is not acceptable, an embodiment may deny, at 304, the device access to the network. Alternatively, an embodiment may provide to the device a data usage proposal that suggests an alternative data allotment that is less than the originally advertised expected data usage. Responsive to receiving acceptance of the terms of the proposal by the device, an embodiment may grant the device access to the network. Conversely, responsive to determining, at 303, that the expected data usage advertised by the device is acceptable, an embodiment may grant, at 304, the device access to the network.

After network access is granted, at 305, an embodiment may continue to monitor the device's data usage to determine, at 306, whether the actual data usage is different than the expected data usage. More particularly, an embodiment may monitor the actual data usage to determine if the actual data usage is more or less than the expected data usage. In an embodiment, a buffer range may be provided for the expected data usage that provides some flexibility for data overuse and/or underuse. The size of the buffer range may be dictated by the expected data usage (e.g., a smaller expected data usage will result in a lower buffer range than a higher expected data usage, etc.).

An embodiment may identify a data overuse situation responsive to identifying that the actual data usage has exceeded the expected data usage or the buffer range associated with the expected data usage. Such identification may provide an indication to the system that a device is consuming an inappropriate amount of data for its advertised task. An embodiment may identify a data underuse situation responsive to identifying that the actual data usage is significantly lower (i.e., by a predetermined amount set by a manufacturer or user) than the expected data usage. Such identification may provide an indication to the system that a device is not performing the way that it should. For example, although a device may not be consuming more data than it originally advertised, it may be performing a variety of lower data consuming tasks that a system may not have approved of.

Responsive to determining, at 306, that the actual data usage is not substantially different than the expected data usage, an embodiment may, at 307, take no additional action. Conversely, responsive to determining, at 306, that the actual data usage is different than the expected data usage, an embodiment may, at 308, perform a remedial action that attempts to address the unexpected data usage. Described below are pluralities of different types of remedial actions that may be taken. These actions may be performed alone or in combination with one another.

In an embodiment, the performance of the remedial action may correspond to a disabling of the device's network access. In an embodiment, the disabling may be a permanent disabling or a temporary disabling. Regarding the former, an embodiment may prevent the disabled device from regaining access to the network until an owner of the network provides express authorization that it may do so. Regarding the latter, an embodiment may temporarily block access to the network for a predetermined period of time (e.g., 1 hour, 1 day, 1 week, etc.). After the predetermined time period has concluded, the device may attempt to connect to the network again.

In an embodiment, the performance of the remedial action may correspond to provision of an alert notification. The alert notification may serve to inform the owner of the network device, the user of the access-granted device, another party, a combination of the foregoing, etc. that the actual data usage is different than exceeded the expected data usage. The notification may be an audio notification, a visual notification, a combination thereof, etc. and may be provided to one or more specified devices (e.g., a designated device associated with the owner, the user's device, etc.).

In an embodiment, the performance of the remedial action may correspond to provision of a request for compensation.

For example, an embodiment may provide an alert to the user of the access-granted device that their device has exceeded its advertised expected data usage and that they are being charged for this overage (e.g., as a penalty). As another example, an embodiment may allow the access-granted device to continue to operate above its advertised data usage but may inform the user that they will be billed at predetermined time intervals for doing so (e.g., every hour, every day, every week, etc.).

In an embodiment, in situations where the actual data usage exceeds the expected data usage, the performance of the remedial action may correspond to a reduction in data usage going forward. Stated differently, an embodiment may continue to provide a device access to the network but may reduce the amount of data that it is possible to consume. These limitations may remain in place for a predetermined period of time (e.g., 1 hour, 1 day, 1 week, etc.), after which they may be lifted and the device's expected data usage allotment may be reinstated. In an embodiment, the limitations may become more severe (i.e., the reduction in data allocation may be greater) as subsequent violations of an advertised excepted data usage are encountered.

In an embodiment, the performance of the remedial action may correspond to a renegotiation of the expected data usage. The renegotiation may essentially be a reversion to step 303. In an embodiment, such a renegotiation may be facilitated after a single or, alternatively, after multiple instances of data use inconsistency have been identified. During the renegotiation, the network device may request additional details regarding the particular tasks the user's device wants to perform. From this point, a new expected data usage may be determined.

The various embodiments described herein thus represent a technical improvement to conventional methods granting a device access to a network and thereafter monitoring its data usage. In an embodiment, a request from a user device to connect to a network may be detected by a network device. An indication may also be received from the user device that outlines its expected data usage while on the network. Responsive to determining that this expected data usage is acceptable, an embodiment may enable the user device access to the network. Thereafter, an embodiment may determine whether the actual data usage by the device is different than the expected data usage that was previously agreed upon. Responsive to determining that a difference has been identified, an embodiment may take one or more remedial actions to address the situation. Such a method may more intelligently decide which devices should obtain network access and may also more efficiently monitor bandwidth usage on a network across all network-connected devices.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, at a network device and from an information handling device, a request to connect to a network;
   receiving, from the information handling device, an indication of an expected data usage to be used by the information handling device on the network;
   identifying whether the indication of the expected data usage is acceptable with respect to a task type projected to be performed by the information handling device;
   enabling, responsive to identifying that the indication of the expected data usage is acceptable, the information handling device to connect to the network;
   determining, using a processor, whether an actual data usage by the information handling device is different than the expected data usage; and
   performing, responsive to determining that the actual data usage is different than the expected data usage, an action.

2. The method of claim 1, wherein the information handling device corresponds to one of: an external device or an internal device.

3. The method of claim 1, wherein the approving comprises:
   comparing the expected data usage to predetermined data allowance settings; and
   determining, based on the comparing, that the expected data usage is within a data allowance threshold.

4. The method of claim 3, further comprising:
   providing, to the information handling device and responsive to determining that the expected data usage is not within the data allowance threshold, an alternative data usage proposal; and
   enabling, responsive to acceptance by the information handling device of the alternative data usage proposal, connection to the network.

5. The method of claim 1, wherein the performing the action comprises providing an alert notification to at least one of: an owner of the network device and a user of the information handling device.

6. The method of claim 1, wherein the determining comprises determining that the actual data usage exceeds the expected data usage.

7. The method of claim 6, wherein the performing the action comprises requesting compensation for the exceedance.

8. The method of claim 6, wherein the performing the action comprises reducing an allotted data usage for the information handling device operating on the network.

9. The method of claim 1, wherein the performing the action comprises disabling access to the network by the information handling device.

10. The method of claim 1, wherein the performing the action comprises renegotiating the expected data usage.

11. A network device, comprising:
    a processor;
    a memory device that stores instructions executable by the processor to:
    detect a request from an information handling device to connect to a network;
    receive, from the information handling device, an indication of an expected data usage to be used by the information handling device on the network;
    identify whether the indication of the expected data usage is acceptable with respect to a task type projected to be performed by the information handling device;
    enable, responsive to identifying that the indication of the expected data usage is acceptable, the information handling device to connect to the network;
    determine whether an actual data usage by the information handling device is different than the expected data usage; and
    perform, responsive to determining that the actual data usage is different than the expected data usage, an action.

12. The network device of claim 11, wherein the information handling device corresponds to one of: an external device or an internal device.

13. The network device of claim 11, wherein the instructions executable by the processor to approve comprise instructions executable by the processor to:
    compare the expected data usage to predetermined data allowance settings; and
    determine, based on the comparing, that the expected data usage is within a data allowance threshold.

14. The network device of claim 13, wherein the instructions are further executable by the processor to:
    provide, to the information handling device and responsive to determining that the expected data usage is not within the data allowance threshold, an alternative data usage proposal; and
    enable, responsive to acceptance by the information handling device of the alternative data usage proposal, connection to the network.

15. The network device of claim 11, wherein the instructions executable by the processor to determine comprise instructions executable by the processor to determine that the actual data usage exceeds the expected data usage.

16. The network device of claim 15, wherein the instructions executable by the processor to perform the action comprise instructions executable by the processor to request compensation for the exceedance.

17. The network device of claim 15, wherein the instructions executable by the processor to perform the action comprise instructions executable by the processor to reduce an allotted data usage for the information handling device operating on the network.

18. The network device of claim 11, wherein the instructions executable by the processor to perform the action comprise instructions executable by the processor to disable access to the network by the information handling device.

19. The network device of claim 11, wherein the instructions executable by the processor to perform the action comprise instructions executable by the processor to renegotiate the expected data usage.

20. A product, comprising:
    a storage device that stores code, the code being executable by a processor and comprising:
    code that detects a request to connect to a network from an information handling device;
    code that receives, from the information handling device, an indication of an expected data usage to be used by the information handling device on the network;
    code that identifies whether the indication of the expected data usage is acceptable with respect to a task type projected to be performed by the information handling device;
    code that enables, responsive to identifying that the indication of the expected data usage is acceptable, the information handling device to connect to the network;
    code that determines whether an actual data usage by the information handling device is different than the expected data usage; and code that performs, responsive to determining that the actual data usage is different than the expected data usage, an action.

\* \* \* \* \*